March 30, 1926.
J. H. HAMMOND, JR
1,578,513
SYSTEM AND METHOD OF PRODUCTION OF CONTINUOUS OSCILLATIONS
Original Filed March 31, 1914
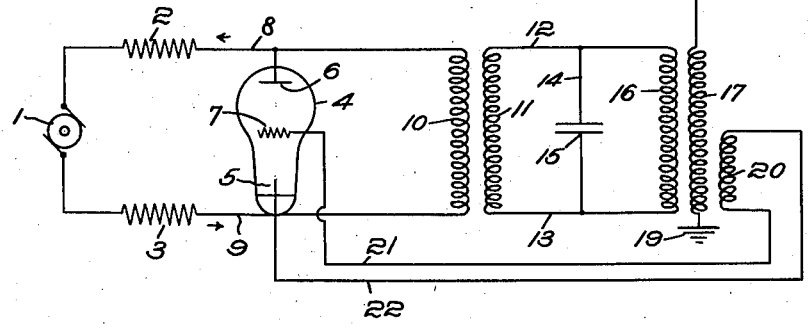
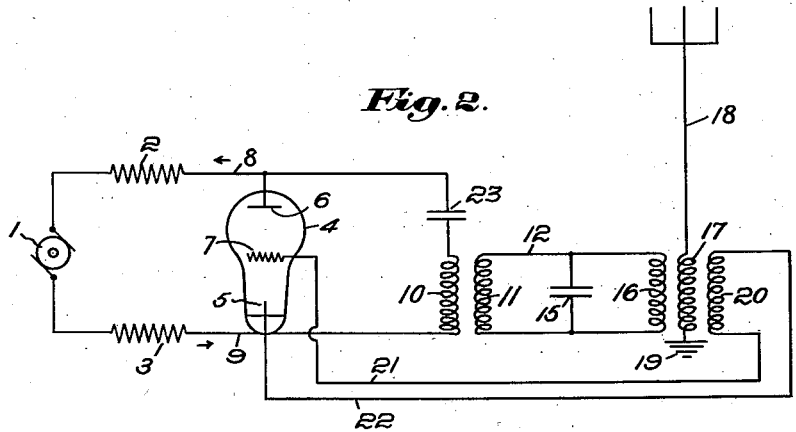
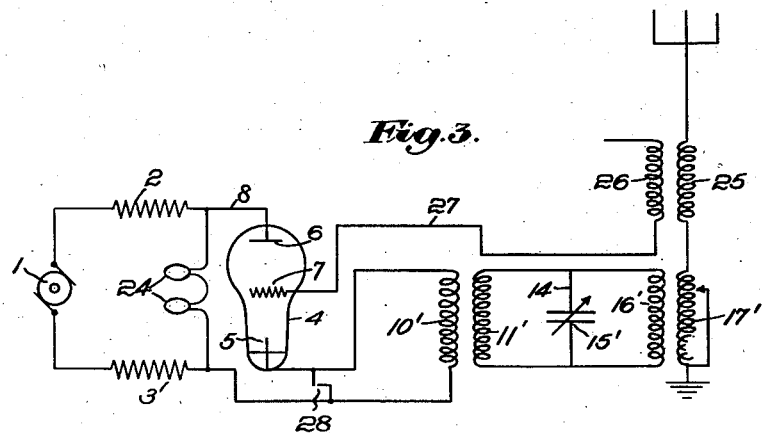
Witnesses:
Horace A. Crosman
Carl L. Choate.
Inventor:
John Hays Hammond, Jr.
by Emery, Booth, Janney & Varney, Attys Patented Mar. 30, 1926.

1,578,513

UNITED STATES PATENT OFFICE.

JOHN HAYS HAMMOND, JR., OF GLOUCESTER, MASSACHUSETTS.

SYSTEM AND METHOD OF PRODUCTION OF CONTINUOUS OSCILLATIONS.

Application filed March 31, 1914, Serial No. 828,605. Renewed July 1, 1921. Serial No. 481,930.

*To all whom it may concern:*

Be it known that I, JOHN HAYS HAMMOND, Jr., a citizen of the United States, and a resident of Gloucester, in the county of Essex and State of Massachusetts, have invented an Improvement in Systems and Methods of Production of Continuous Oscillations, of which the following description, in connection with the accompanying drawings, is a specification, like characters on the drawings representing like parts.

This invention relates to a system and method for the production of undamped and continuous oscillations of high frequency for the production of electromagnetic waves.

In order that the principle of the invention may be readily understood, I shall describe certain embodiments of apparatus for carrying out my system and for practicing my method.

In the drawings,—

Fig. 1 is a diagrammatic representation of one form of apparatus or system for practicing my invention; and Figs. 2 and 3 are slightly modified forms thereof.

Referring more particularly to the drawings and first to the system shown in Fig. 1, I have therein represented a generator of direct current at 1, this generator being of any suitable type or character. I preferably provide choke coils at 2, 3, and at 4 I provide what I herein designate as a high frequency electric valve. This so-called "valve" is a suitable chamber, container or bulb, preferably containing a rarefied gas, such for example as mercury vapor, although I am not limited to the use of such vapor. The said valve is herein represented as similar in construction to the so-called audion, a detector of the vacuum or gaseous type. Said container or valve has suitably mounted therein a steel or other suitable bar or point 5 constituting a cathode, and which may be in a mercury bath; a plate 6 constituting an anode, and a grid 7 or potential gradient changing means whereon a charge may accumulate as hereinafter set forth, thereby to change the potential gradient between the cathode and anode. The said cathode and anode are in circuit with the conductors 8, 9 leading from the choke coils. The said conductors are provided with a coil 10 constituting the primary of an oscillatory transformer. The secondary coil of said transformer is indicated at 11, and leading therefrom are conductors 12, 13 connected by a so-called "fly wheel circuit" or storage circuit 14 having therein a condenser 15. The said conductors 12, 13 are provided with a coil 16 constituting a member of a second oscillatory transformer. The circuit including the primary coil 16 of said second oscillatory transformer is inductively connected with a secondary coil 17, forming a portion of the open transmitting aerial or resonating circuit 18 connected to earth at 19.

Inductively connected with the resonating or aerial circuit 18, and, as herein shown, with the induction coil 17, is a transformer coil 20 which is connected by conductor 21 with the grid 7 and by conductor 22 with the cathode 5.

If a buzzer set be used to energize the antenna or open, resonating, aerial circuit 17, 18, in its free period, the said antenna or circuit will oscillate electrically without requiring continued operation of the buzzer set, and alternating current waves will be transmitted from the coil or winding 17 to the coil 20, and if the valve or chamber 4 has direct current flowing from the cathode 5 to the anode 6, the said valve or chamber will present a rectifying quality which will cause an accumulation of negative electricity on the grid 7. This accumulation of negative electricity will change the potential gradient between the cathode 5 and the anode 6. The grid 7, being ultranegative with regard to the cathode 5, will stop the flow of current from the cathode 5 to the anode 6. When this action occurs the fluctuation of current which takes place through the primary winding 10 of the oscillatory transformer will set up alternating currents in the so-called "fly wheel circuit" 14. These alternating currents will in turn produce alternating currents in the open aerial or resonating circuit 17, 18. These alternations will react on the winding 20, and this will cause a change of the charge on the grid 7. That is to say, when a negative charge is induced in the winding 20, the direct current will be interrupted through the said valve or chamber 4. In this manner, the said aerial circuit controls the action of the direct current flow. However, since the aerial circuit is energized by the periodic interruption of the direct current flow, it will be seen that the parts of the system are interdependent.

In Fig. 2, I have represented a system differing from that shown in Fig. 1 mainly in that I employ a condenser 23 in the circuit containing the valve, chamber or container 4. The apparatus and system illustrated in Figs. 1 and 2 are intended to constitute a transmitting system of radiant energy in the form of electro-magnetic waves.

In Fig. 3, I have shown a somewhat similar apparatus but one adapted for use either as a transmitting or a receiving system. Therein I have indicated the parts corresponding to those shown in Figs. 1 and 2 by the same reference numerals. At 24 I have indicated telephones suitable to withstand the large amount of current that will be used in this system. It will, moreover, be observed that the primary winding 10′ is normally in circuit with the cathode 5, the direct current generator 1 and the plate or anode 6. The aerial or resonating circuit is provided with a variable inductance coil 17′ and also with a coil 25 with which is inductively connected a coil 26 connected by conductor 27 with the grid 7. A switch 28 is arranged in such a manner that when it is closed the primary winding 10′ will be short circuited or "cut out", but when it is open the primary winding 10′ will be effective. Each alternation of the current in the open aerial circuit 17′, 25 tends to produce a change of potential of the grid 7 through the action of the transformer 25, 26. This change of potential on the grid 7 in turn controls the flow of direct current through the so-called electric valve 4. When the switch 28 is open this will cause an interrupted direct current flow through the primary winding of the transformer 10′ which will produce alternating currents in the "fly wheel circuit" 14, 15′, which will co-act on the aerial circuit 17′, said circuit in turn reacting upon the grid either through the action of the transformer or through electrostatic action or in any other suitable way. When it is desired to utilize the system for receiving instead of for transmitting signals the switch 28 is closed, thus short circuiting or cutting out the primary transformer winding 10′ and consequently rendering the fly wheel circuit 14, 15′ ineffective. In this condition of the system, the telephones 24 are connected in shunt through the switch 28 with the "valve" or detector 4, and when a signal of radiant energy is received by the open aerial circuit 25 the voltage on the grid 7 will be varied through the responsive action of the coil 26 and this will cause a variation in the current passing through the detector 4 the effects of which may be readily heard in the telephones 24.

From the foregoing description, it will be evident that I have provided a system and have disclosed a method for the production of undamped and continuous electric oscillations of high frequency for the production of electromagnetic waves. Although I have disclosed certain embodiments of apparatus constituting the system, it will be evident that other types of apparatus may be employed for this purpose, and that I am not limited in the practice of my method to the employment of those forms of systems herein represented.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A system for the production of electric oscillations, comprising a detector having a cathode, an anode, and potential gradient changing means, an aerial circuit, means operatively connecting said circuit to said potential gradient changing means to cause said circuit to control the operation of said detector, a circuit controlled by said detector and including a source of electric energy, and means arranged to be energized as a result of the action of said detector for producing electric oscillations in said aerial circuit.

2. A system for the production of electric oscillations, comprising a detector having a cathode, an anode, and potential gradient changing means, an aerial circuit, means inductively connecting said circuit to said potential gradient changing means to cause said circuit to control the operation of said detector, a circuit controlled by said detector and including a source of electric energy, and means arranged to be energized as a result of the action of said detector for producing electric oscillations in said aerial circuit.

3. A system for the production of continuous electric oscillations, comprising a direct current source, a gaseous valve having a cathode, an anode and potential gradient changing means, a primary inductance coil in circuit with said valve, a secondary inductance coil, a second oscillatory transformer in circuit with said secondary coil and including an aerial circuit, and means in inductive relation to said aerial circuit for controlling said potential gradient changing means.

4. A system for the production of continuous electrical oscillations comprising a source of electric current, a circuit energized from said source, a detector of feeble electric currents controlling said circuit, and including a receptacle, two spaced electrodes in said receptacle, and a conducting body interposed in said receptacle between said electrodes, an aerial circuit, a circuit connected to said conducting body and coupled to said aerial circuit, and a circuit connecting said electrodes and coupled to said aerial circuit.

5. A system for the production of continuous electrical oscillations comprising a source of electric current, a circuit energized from said source, a detector of feeble electric currents controlling said circuit and including a receptacle, two spaced electrodes in said receptacle and a conducting body interposed in said receptacle between said electrodes, an aerial circuit, a circuit connected to said conducting body and inductively coupled to said aerial circuit, and a circuit connecting said electrodes and inductively coupled to said aerial circuit.

6. Means for producing sustained high frequency oscillations comprising an oscillatory circuit having two electrodes, a second circuit having a conducting body interposed between said electrodes and an open aerial circuit arranged to be controlled by said first mentioned circuit and to control said second mentioned circuit.

7. The method of producing electrical oscillations in an aerial circuit of a radio transmission system which comprises generating a direct current in a second circuit, causing a fluctuation in said current by an initial energization of said aerial circuit, producing in a third circuit an oscillatory current from said fluctuating current, and producing from said oscillatory current an oscillatory current in said aerial circuit.

8. A system for the production of electrical oscillations, comprising an aerial circuit, a detector, means operatively connecting said circuit to said detector and arranged to cause electrical oscillations produced in said circuit to control said detector, a circuit controlled by said detector and including a source of electrical energy, and a circuit controlled by said detector and operatively connecting said detector to said aerial circuit in such a manner as to cause current fluctuations in said detector to set electrical oscillations in said aerial circuit.

9. A system for the production of electrical oscillations, comprising an aerial circuit, a mercury vapor detector, means operatively connecting said circuit to said detector and arranged to cause electrical oscillations produced in said circuit to control said detector, a circuit controlled by said detector and including a source of electrical energy, and a circuit controlled by said detector and operatively connecting said detector to said aerial circuit in such a manner as to cause current fluctuations in said detector to set electrical oscillations in said aerial circuit.

10. In a signaling system, means for transmitting sustained, high frequency electric oscillations, comprising a source of electric energy, a circuit energized from said source, a three-electrode vacuum tube controlling said circuit, a storage circuit coupled with said first-mentioned circuit, an oscillatory circuit inductively connected to the input side of said tube to control the action of the same, and inductively connected to said storage circuit to be controlled thereby, whereby continuous electric oscillations may be produced in said oscillatory circuit.

11. In a radio system, the combination with an antenna, of an electron discharge device having grid and plate circuits inductively connected to said antenna and so arranged that oscillations will be produced in said antenna, said antenna being provided with means for tuning the same thereby varying the frequency of the oscillations produced.

12. A transmitting system for radiant energy including an antenna, a thermionic oscillator comprising a cathode, an anode, and potential gradient changing means, a circuit connecting said cathode and said anode and including a source of electric energy, a circuit connecting said cathode and said potential gradient changing means and operatively connected to said antenna, and a circuit connecting said cathode and said anode and operatively connected to said antenna.

13. A transmitting system for radiant energy including an antenna, a thermionic oscillator comprising a cathode, an anode, and potential gradient changing means, a circuit connecting said cathode and said anode and including a source of electric energy, a circuit connecting said cathode and said potential gradient changing means and operatively connected to said antenna, and a circuit connecting said cathode and said anode and operatively connected to said antenna, said two last mentioned circuits being so arranged that oscillations may be produced and maintained in said antenna.

14. The combination of a vacuum tube generator of high frequency oscillations, a storage circuit to which high frequency oscillations are supplied, a radiating circuit which is supplied from said storage circuit, and a connection from said radiating circuit to said generator for maintaining constant the frequency of the oscillation generated.

15. The combination of a vacuum tube generator of high frequency oscillations, a storage circuit to which high frequency oscillations are supplied, a radiating circuit which is supplied from said storage circuit and means associated with the radiating circuit for maintaining substantially constant the frequency of the oscillations generated.

In testimony whereof, I have signed my name to this specification.

JOHN HAYS HAMMOND, Jr.